US008755311B2

(12) United States Patent
Nejatian

(10) Patent No.: US 8,755,311 B2
(45) Date of Patent: Jun. 17, 2014

(54) METHOD AND A DEVICE FOR CALIBRATION

(75) Inventor: Alireza Nejatian, Uppsala (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 189 days.

(21) Appl. No.: 13/127,653

(22) PCT Filed: Nov. 17, 2008

(86) PCT No.: PCT/SE2008/051317
§ 371 (c)(1),
(2), (4) Date: May 4, 2011

(87) PCT Pub. No.: WO2010/056171
PCT Pub. Date: May 20, 2010

(65) Prior Publication Data
US 2012/0076055 A1 Mar. 29, 2012

(51) Int. Cl.
H04B 7/005 (2006.01)
H04J 3/00 (2006.01)

(52) U.S. Cl.
USPC ........... 370/278; 370/280; 370/330; 370/281; 370/347; 358/1.15; 358/435; 358/436

(58) Field of Classification Search
USPC ................ 370/278, 280, 330, 281, 503, 347; 358/1.15, 435, 436; 375/347; 455/137
See application file for complete search history.

(56) References Cited

U.S. PATENT DOCUMENTS

| 6,118,811 | A | 9/2000 | Narumi et al. |
| 7,085,372 | B1* | 8/2006 | Heise ............... 379/399.01 |
| 7,719,704 | B1* | 5/2010 | Guata ............... 358/1.15 |
| 2002/0042290 | A1 | 4/2002 | Williams et al. |
| 2002/0084844 | A1* | 7/2002 | Monroe ............... 330/51 |
| 2007/0019667 | A1* | 1/2007 | Mottier et al. ........... 370/458 |
| 2009/0042593 | A1* | 2/2009 | Yavuz et al. ............ 455/522 |
| 2009/0059820 | A1* | 3/2009 | Jung et al. ............. 370/280 |

FOREIGN PATENT DOCUMENTS

| EP | 1 120 858 A2 | 8/2001 |
| EP | 1 389 837 A1 | 2/2004 |
| EP | 1 732 163 A1 | 12/2006 |
| EP | 1 777 838 A2 | 4/2007 |
| WO | WO 2008/088255 A1 | 7/2008 |

OTHER PUBLICATIONS

International Search Report, PCT/SE2008/051317, Jun. 26, 2009.
Nishimori et al. "A new calibration method of adaptive array for TDD systems" *IEEE International Symposium Antennas and Propagation Society*, 2(11):1444-1447 (Jul. 11, 1999-Jul. 16, 1999).

(Continued)

Primary Examiner — Charles C Jiang
Assistant Examiner — Jamal Javaid
(74) Attorney, Agent, or Firm — Myers Bigel Sibley & Sajovec, P.A.

(57) ABSTRACT

An eNodeB in a TDD system (100), comprising first and second transmitters (408-411), a first receiver (302; 402-405), a control unit (306, 416), and means (305, 415) for diverting part of a transmitted signal from the first and second transmitters (408-411) to the first receiver (302; 402-405). The diverting means (305, 415) are connected to the transmitter part via a switch function (308, 418) and the transceiver also comprises a delay component (304, 404. The control unit (306, 416) activates the switch (308, 418) when the output power of the transmitted signals falls below a threshold, and the delay component (304, 404) delays so that the diverted signals are received by the receiver part (303; 402-405) at a predefined point in time. The transceiver (300) comprises a comparison unit (307, 417) for comparing the diverted signals from the first and second transmitters after reception through the first receiver.

12 Claims, 5 Drawing Sheets

(56) References Cited

OTHER PUBLICATIONS

International Report on Patentability with Written Opinion of the International Searching Authority, PCT/SE2008/051317, May 17, 2011.

3GPP, "$3^{rd}$ Generation Partnership Project Technical Specification Group Radio Access Network; Evolved Universal Terrestrial Radio Access (E-UTRA); Physical Channels and Modulation (Release 8)", 3GPP TS 36.211 V8.2.0 (Mar. 2008), 65 pp.

* cited by examiner

METHOD AND A DEVICE FOR CALIBRATION

CROSS REFERENCE TO RELATED APPLICATION

This application is a 35 U.S.C. §371 national stage application of PCT International Application No. PCT/SE2008/051317, filed on 17 Nov. 2008, the disclosure and content of which is incorporated by reference herein in its entirety. The above-referenced PCT International Application was published in the English language as International Publication No. WO 2010/056171 A1 on 20 May 2010.

TECHNICAL FIELD

The present invention discloses a transceiver for use as an eNodeB in a cellular telecommunications system of the Time Division Duplex kind, in which there are means for a novel and improved calibration.

BACKGROUND

In a transceiver such as those used as so called base stations, i.e. a station which has a controlling function for the users in a cell, it is important to be able to calibrate the transmitter and the receiver, in particular in cellular systems of the TDD kind, Time Division Duplex. In particular, many base stations can have multiple transmitters and receivers, which will create a need to calibrate all of these transmitters and receivers. This need is particularly important in so called TDD systems within the LTE concept, Long Term Evolution. In LTE, the base stations are usually referred to as eNodeB.

One known way of carrying out calibration of transmitters and/or receivers in an eNodeB is so called design or factory calibration. As the name implies, this kind of calibration is done at the manufacturing or design stage, and puts high demands on accuracy in design and manufacturing, as well as a great need for accurate information on variations which need to be taken into account.

If this method is used, there will be no information about site specific factors such as, for example, feeders and jumpers between the base station and an antenna input, which means that such information needs to be given to, for example, a central processor which can use the information later as a correction basis for misalignments in the system.

Another known method for calibration is to calibrate time and/or phase differences by means of a calibration unit. According to this method, the calibration unit is used to calibrate the transmitter(s) and/or the receiver(s). Generally speaking, calibration of, for example, a transmitter, is carried out by means of the unit injecting a known signal into the transmitter at baseband level, feeding the signal back from a suitable point, and comparing this signal with the known injected signal, by means of which it is possible to calculate variations in such parameters as, for example, gain and phase/delay. Based on such calculations, a correction or compensation can then be made.

Such an extra unit will be quite large, and will need to be installed in the base station. The unit will be powered more or less constantly, and will create additional system noise even in an ideal mode. This method also causes a need for extra cables to be connected between the sampling point(s) and the calibration unit, as well as other cables to transfer sampled signals for further processing in the baseband part of the base station.

SUMMARY

As explained above, there is thus a need for a solution by means of which calibration of a transmitter and/or a receiver in a transceiver for use as a base station for a cellular system can be carried out in an improved manner. The solution should in particular be applicable to a system of the TDD kind, with particular emphasis on being used in a base station of a TDD system within LTE, i.e. in an eNodeB.

The present invention addresses this need by disclosing a transceiver for use as an eNodeB in a cellular telecommunications system of the TDD kind, Time Division Duplex. The transceiver of the invention comprises a transmitter part with at least a first and a second transmitter as well as a receiver part with at least a first receiver, and also comprises a control unit as well as means for diverting at least part of a transmitted signal from each of the first and second transmitters to the first receiver of the receiver part.

In the transceiver of the invention, the diverting means are connected to the transmitter part via a switch function, and in the transceiver also comprises a delay component; the control unit is adapted to activate the switch to a diversion position when the output power of the transmitted signals falls below a first predefined threshold, and the delay component is adapted to delay so that the diverted signals are received by the receiver part at a predefined point in time. The transceiver also comprises a comparison unit for comparing the diverted signals from the first and second transmitters to each other after reception through the first receiver, so that calibration of the transmitters can be carried out based on said comparison.

Thus, by means of the invention, with minor additions, the equipment needed for the ordinary operation of the radio station can be used for calibration purposes, which eliminates the need for bulky extra calibration units, and which also naturally eliminates the need for factory or design calibration.

In one embodiment of the invention, the transmitter part comprises a plurality of transmitters, and the diverting means are adapted to divert at least part of a transmitted signal from two or more of the transmitters to the first receiver of the receiver part. In this embodiment, the transceiver also comprises a first additional switching unit by means of which signals from any two or more transmitters may be connected to the diverting means, so that a choice can be made regarding which two or more transmitters that should be comprised in the calibration.

In one embodiment of the transceiver, the receiver part comprises a plurality of receivers, and the first additional switching unit is also adapted to connect diverted transmitter signals to one of these receivers, in a fixed or in an adaptive manner, so that they may be fed from said receiver to the comparison unit. In this embodiment, there is thus a choice of which receiver that is used for the calibration of the transmitters.

In one embodiment, the transceiver comprises a second additional switch by means of which a diverted transmitted signal may be diverted to any of said plurality of receivers, so that a diverted signal from one of said transmitters may be fed to two or more receivers, by means of which the two or more receivers may be calibrated using the comparison unit.

The invention also discloses a method for calibration of a transceiver such as an eNodeB in a TDD system.

BRIEF DESCRIPTION OF THE DRAWINGS

The invention will be described in more detail in the following, with reference to the appended drawings, in which.

DETAILED DESCRIPTION

Figure 1:
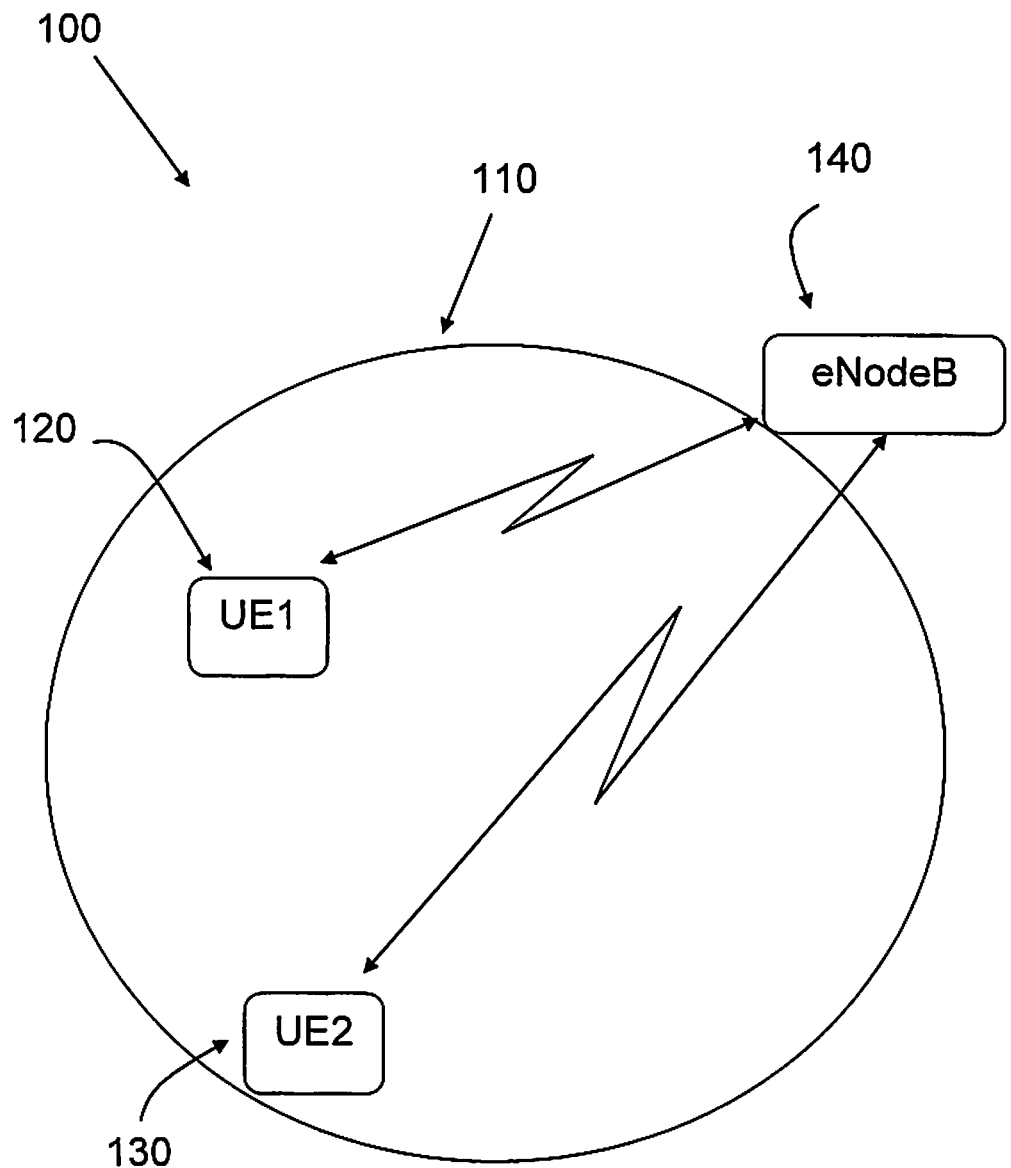
FIG. 1 shows an overview of a system in which the invention can be applied.

FIG. 1 shows a schematic view of a system 100 in which the present invention may be applied. The system 100 is an LTE system, Long Term Evolution, so the terminology used in the following in order to describe the invention will be terminology borrowed from the LTE standards. It should however be pointed out that the use of LTE terminology in this text is merely in order to facilitate the reader's understanding of the invention, and is not intended to restrict the scope of protection sough or granted for the present invention, which may be applied in other cellular systems as well.

The system 100 comprises a number of cells, one of which is shown as 110 in FIG. 1. Each cell can accommodate a number of users, UEs, two of which are shown as 120 and 130 in FIG. 1. For each cell there is also a so called "base station", in LTE referred to as eNodeB, which is shown in FIG. 1 as 140. The eNodeB 140 has as one of its functions to control the traffic to and from the UEs 120, 130, of the cell 110.

The LTE system 100 employs the so called TDD-principle, Time Division Duplex. According to this principle, transmissions from the UEs to the eNodeB, so called uplink, UL, transmissions, alternate with transmissions from the eNodeB to the UEs, so called downlink, DL, transmission.

Figure 2:
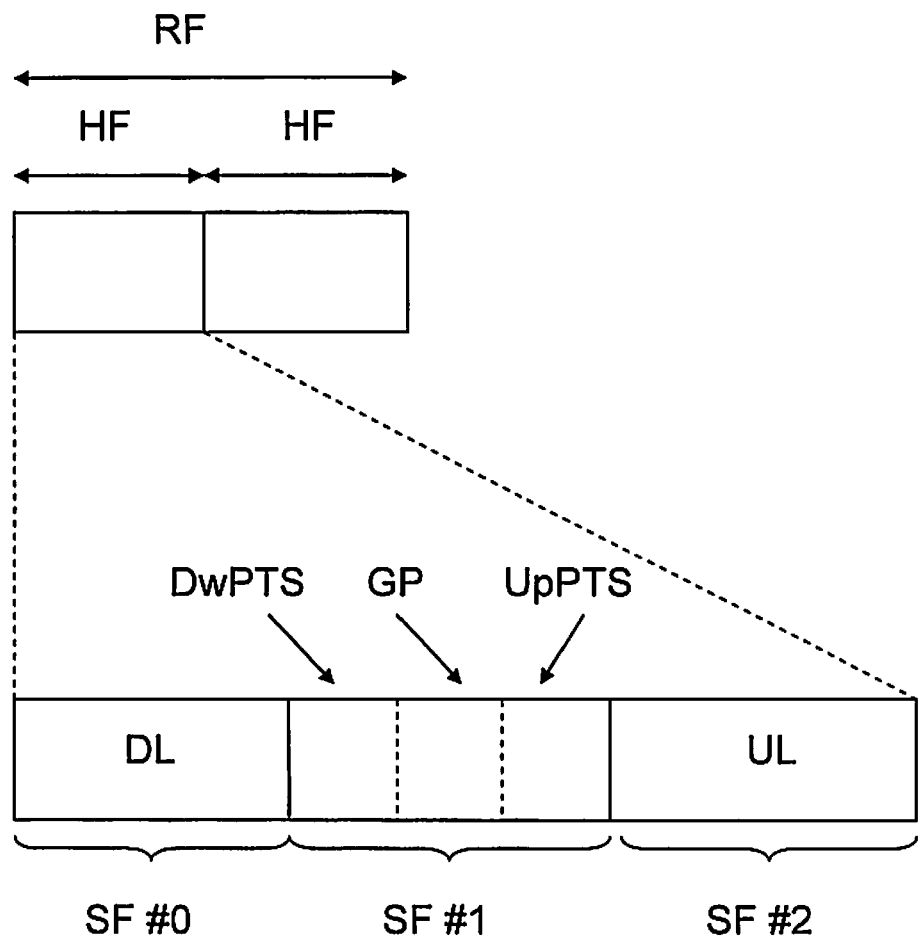
FIG. 2 shows a time frame in a system in which the invention may be applied.

An example of time division in an LTE TDD system is shown in FIG. 2: in LTE, transmissions are divided into so called radio frames, RF, which last 10 ms each. Each radio frame is divided into two half frames, HF, of 5 s each, and each HF comprises a number of subframes, SF, with each HF usually comprising 10 SFs, although only three SFs are shown in FIG. 2.

Some of the subframes in a half frame may be used for DL, while others may be used for UL. In the example shown in FIG. 2, SF 0 is used for DL, and SF 2 is used for UL. SF1 then becomes a so called special subframe or "switching point" between DL and UL. As shown in FIG. 2, a switching point comprises three parts, DwPTS, UpPTS and GP.

The GP; the Guard Period, is a period when no transmissions may be made by any part in the system, neither UL nor DL transmissions, while DwPTS is a period when, inter alia, the DL transmissions are ramped down in order to become totally "silent" in time for the GP.

The fact that the special subframe or switching point comprises a point when the DL transmissions are ramped down and also comprises a period, GP, when no transmission are made, is capitalized upon by the invention in order to perform calibration measurements in the eNodeB:

In an eNodeB which uses the invention, at a predefined point during the down ramping of the DL power, the DL signal is sampled, with the predefined point in time being a point in time when the output power of the DL signal reaches a pre-determined level. The sampled signal is fed to the receiver part of the eNodeB, and the invention uses a delay function in order to let the sampled DL reach the receiver part when the system is in the Guard period.

During the guard period, and before the UpPTS period begins, the sampled DL signal can be compared to the originally transmitted signal. In this way, any misalignments can be calculated.

If, as is often the case in an eNodeB in an LTE system, there is more than one so called radio chain in the eNodeB, the principle explained above may be used in order to calibrate different chains against each other, so that any misalignments between the chains may be detected and corrected.

Figure 3:
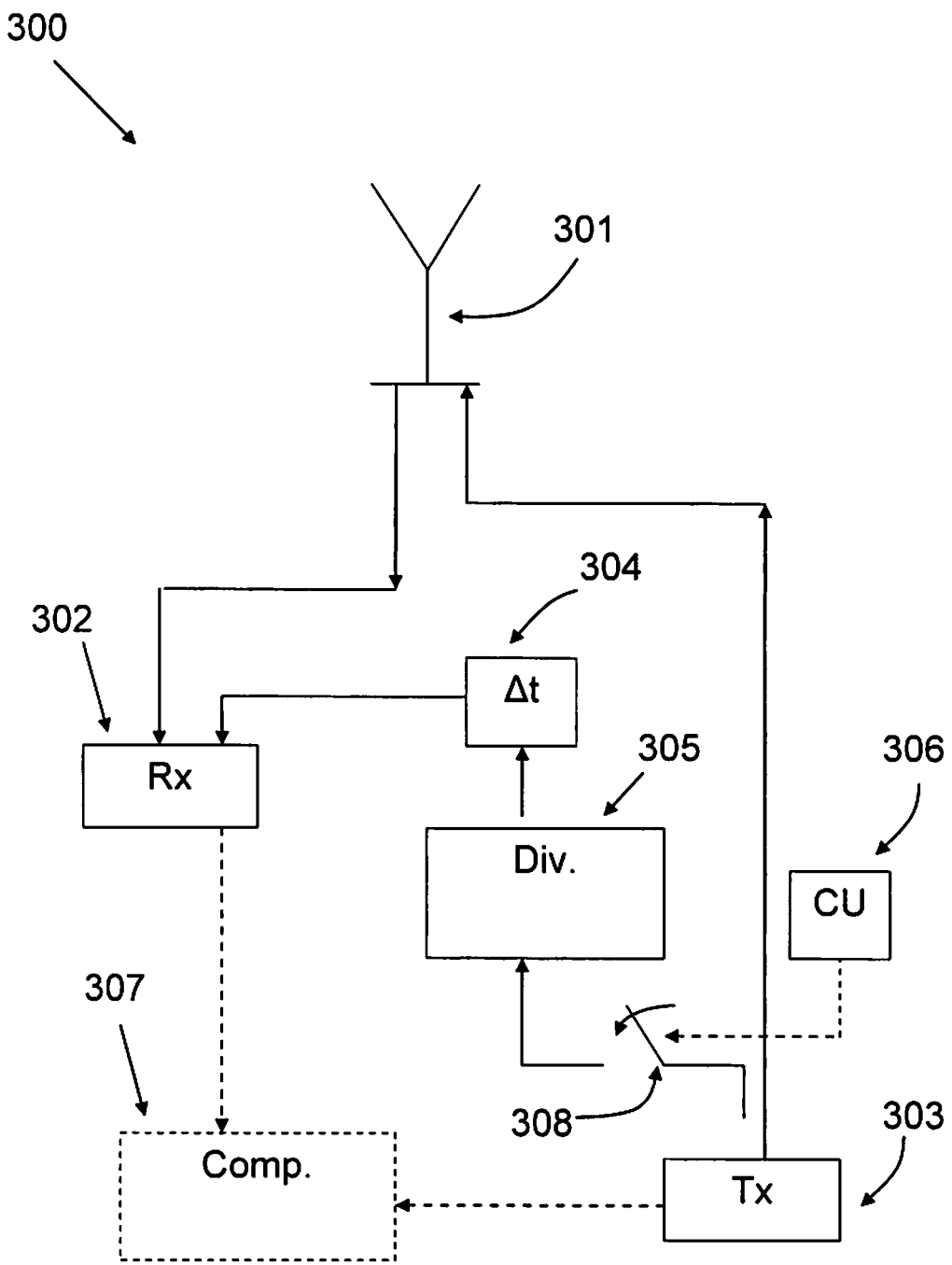
FIG. 3 shows a first embodiment of a device of the invention.

FIG. 3 schematically shows a first embodiment 300 of an eNodeB according to the invention. As can be seen in FIG. 3, the eNodeB 300 comprises an antenna 301, a receiver part 302, and a transmitter part 303. In addition, the eNodeB also comprises diverting means 305 such as, for example, a directional coupler, in order to diverting at least part of a transmitted signal from the transmitter part 303 to the receiver part 302. As will be discussed in more detail later, the transmitter part 303 comprises two or more individual transmitters, and the receive part 302 can also comprise more than one individual receiver.

In the eNodeB 300, the diverting means 305 are connected to the transmitter part 303 via a switch 308, and the eNodeB also comprises a delay component 304, such as, for example a delay line.

The eNodeB 300 also comprises a control unit 306, which is adapted to activate the switch 308 to a "diversion position" when the output power of the signal from the transmitter part 303 falls below a first predefined threshold. This threshold is, as explained previously, suitably a threshold which is reached during the down ramping of the DL signal from the transmitter 303 during the DwPTS period. The control unit 306 can thus, for example, either operate on a timer which enables it to activate the switch 308 at the proper point in time, or the control unit 306 can comprise a "power meter", by means of which the control unit 306 can detect when the output power from the transmitter part 303 has reached the predefined threshold level.

In the eNodeB 300, the delay component 304 is designed to delay the diverted DL signal so that the diverted signal is received by the receiver part 302 at a predefined point in time, suitably during the guard period, as explained above.

As indicated in FIG. 3, the eNodeB 300 also comprises a comparison unit 307 for comparing signals from two individual transmitters in the transmitter 303 to each other after they have been received through the receiver 302, so that calibration of the two individual transmitters in the transmitter part 303 may be carried out based on this comparison.

The term "individual transmitter" should not be taken to refer exclusively to a transmitter; the invention can also be used to calibrate transmitters including connecting cables, wave guides, etc. This is also sometimes referred to as a "radio chain", so that the invention can then be said to be used for comparing signals from two or more radio chains to each other.

In the case described above, i.e. when there are two transmitters in the transmitter part 303, the signals from those two transmitters are thus diverted and fed through the receiver in the receive part 302, and then to the comparison unit 307. If the two signals are denoted as Tx1 and Tx2 at the output from the receiver, the difference (or sum) of Tx1 and Tx2, i.e. Tx1-Tx2 is formed in the comparison unit 307, and compared to an ideal value, for example zero, "0, since there should be no differences between the signals.

If the difference between Tx1 and Tx2 does not equal the ideal value, calibration of the individual transmitters can then be carried out on the basis of the deviation.

Figure 4:
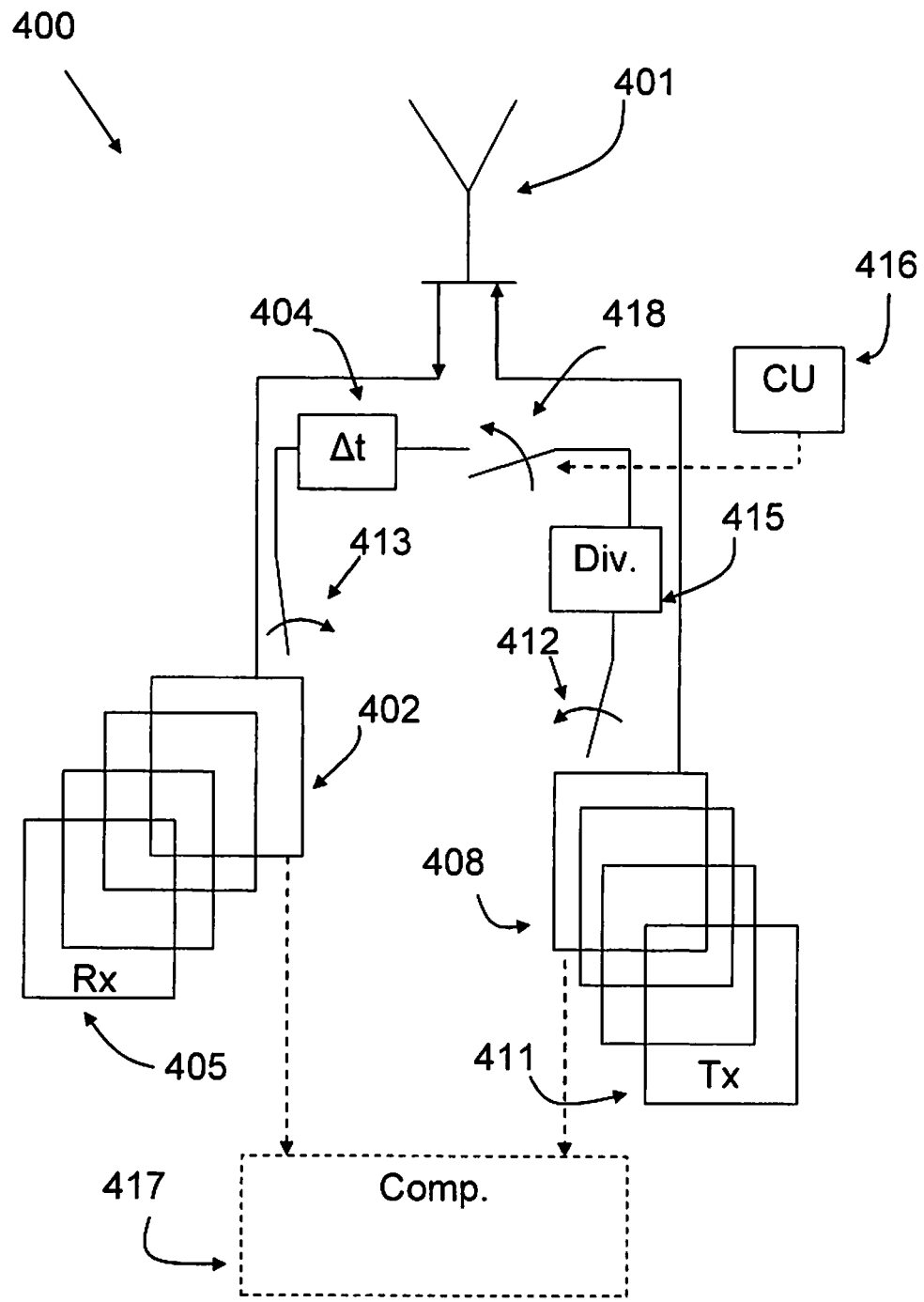
FIG. 4 shows a second embodiment of a device of the invention.

In many applications, a transceiver such as an eNodeB can comprise a multitude of transmitters, as well as a multitude of receivers. In such a transceiver, there will be a need to calibrate the transmitters and/or the receivers which are comprised in the transceiver, i.e. in the eNodeB. FIG. 4 shows an embodiment 400 of the present invention by means of which such calibration may be performed.

As can be seen in FIG. 4, the principle behind the embodiment 400 is the same as the principle behind the embodiment 300 of FIG. 3, but the transceiver of FIG. 4 comprises a number of transmitters, 408-411, as well as a number of receivers 402-405. The number of transmitters and receivers is naturally only an example, the number of such components which can be comprised in this embodiment of the invention can be more or less an arbitrary number.

The embodiment 400 comprises a switch 418 which is controlled by a control unit 416; both of these units function in a manner corresponding to the switch 308 and the control unit 306 of FIG. 3.

In order for the transmitters to be calibrated, the embodiment 400 comprises (in comparison to the embodiment 300) an additional switch 412, by means of which signals from any two or more transmitters may be connected to the diverting means 415, and from there to the receiver part for comparison and subsequent calibration.

The diverted transmit signals may be diverted to any of the receivers (in the case of more than one receiver), which may be done in a fixed manner, or by means of a second additional switch 413, which allows switching of a diverted transmit signal or signals between the receivers 402-405.

Conversely, in order for the receivers to be calibrated, the additional switch 413 may also be used to connect a diverted transmitted signal from one of the transmitters to any two or more of the receivers 402-405, by means of which calibration may be carried out of the receivers to which the diverted transmitted signal is connected.

Naturally, if it is only desired to calibrate the receivers, the switch 412 may be omitted, and, similarly, the switch 413 may be omitted if it is only desired to calibrate the transmitters. In addition, the switch 413 may be omitted when calibrating the receivers 402-405 by means of letting all of the receivers in the calibration receive the diverted transmitted signal. For this purpose, a splitter may have to be used at the inputs to the receivers. In this case, the diverted signal will be led through all of the receivers in the calibration, and the signal from each of the transmitters will then be used in the calibration.

When the receivers and/or the transmitters are to be calibrated, this is suitably done by injecting reference symbols at the transmit side, with the reference symbols being different for each transmitter or receiver that is to be calibrated. The reference symbols should be orthogonal to each other, so that they are easily distinguishable from each other. The use of orthogonal reference symbols as such is well known to those skilled in the art, and will for that reason not be explained in more detail here. The reference symbols are injected into the transmitter or transmitters by a reference signal generation unit, which is not shown in FIG. 3 or 4.

Calibration of the Transmitters 408-411

In order to calibrate the transmitters 408-411, known reference symbols are injected to each transmitter which is to be calibrated, with the symbols for each transmitter being orthogonal to each other, so that they may easily be distinguished from each other.

The signals from each of the transmitters which are to be calibrated are diverted in the manner and at the point in time described above, and then "fed back" into one of the receivers, for example the receiver 405.

If, for example, the transmitters which are to be calibrated are the transmitters 408-411, then orthogonal reference signals are fed to these transmitters, and these signals are then "received" via (i.e. diverted to) one and the same receiver, in this example the receiver 405.

The differences between the received signals which have been received through the receiver 405, should then, in a system which is perfectly calibrated, be the same. This can be exemplified as follows: If we denote the signal from the transmitters 408-411 as Tx1-Tx4 respectively, then, after reception through one and the same receiver, in this example the receiver 405, and if, for example, Tx1 is used as reference, then Tx4-Tx1 should equal Tx3-Tx1, which should also equal Tx2-Tx1. If this is not the case, the system 400 may be calibrated using the measurements.

In general, Txk-Txref should equal Tx(k+n)-Txref, where Txref is the reference transmit signal and k and n are any integers which fit the total amount of transmitters. Naturally, instead of the differences between the signals being zero, the system can also be such that the differences should equal another ideal value. Also, the sum of the signals may be compared, instead of the differences between them.

Calibration of the Receivers 402-405

Calibration of the receivers is performed using essentially the same principle as with the transmitters, but with the difference that orthogonal reference signals are injected into one and the same transmitter, for example the transmitter 408, and are then diverted in the manner described above and fed to two or more different receivers, with one of the receivers, for example the receiver 405, serving as a reference against which all other receivers are then calibrated. This is done by means of the switch 413, which selects (controlled form the control unit 416) which of the receivers that the diverted signal should be fed to.

In similarity to the case when the transmitters are calibrated, one of the receivers is chosen as reference receiver, and the difference between (or sum of) the signal through this receiver and the signal through any of the other receivers should equal an ideal value. Using references similar to those in the case of transmitter calibration, in general, Rxk−Rxref should equal Rx(k+n)−Rxref, where Rxref is the reference transmit signal and k and n are any integers which fit the total amount of transmitters.

If this is not the case, calibration may be performed until this is the case, or until the differences have reached an acceptable level.

Figure 5:
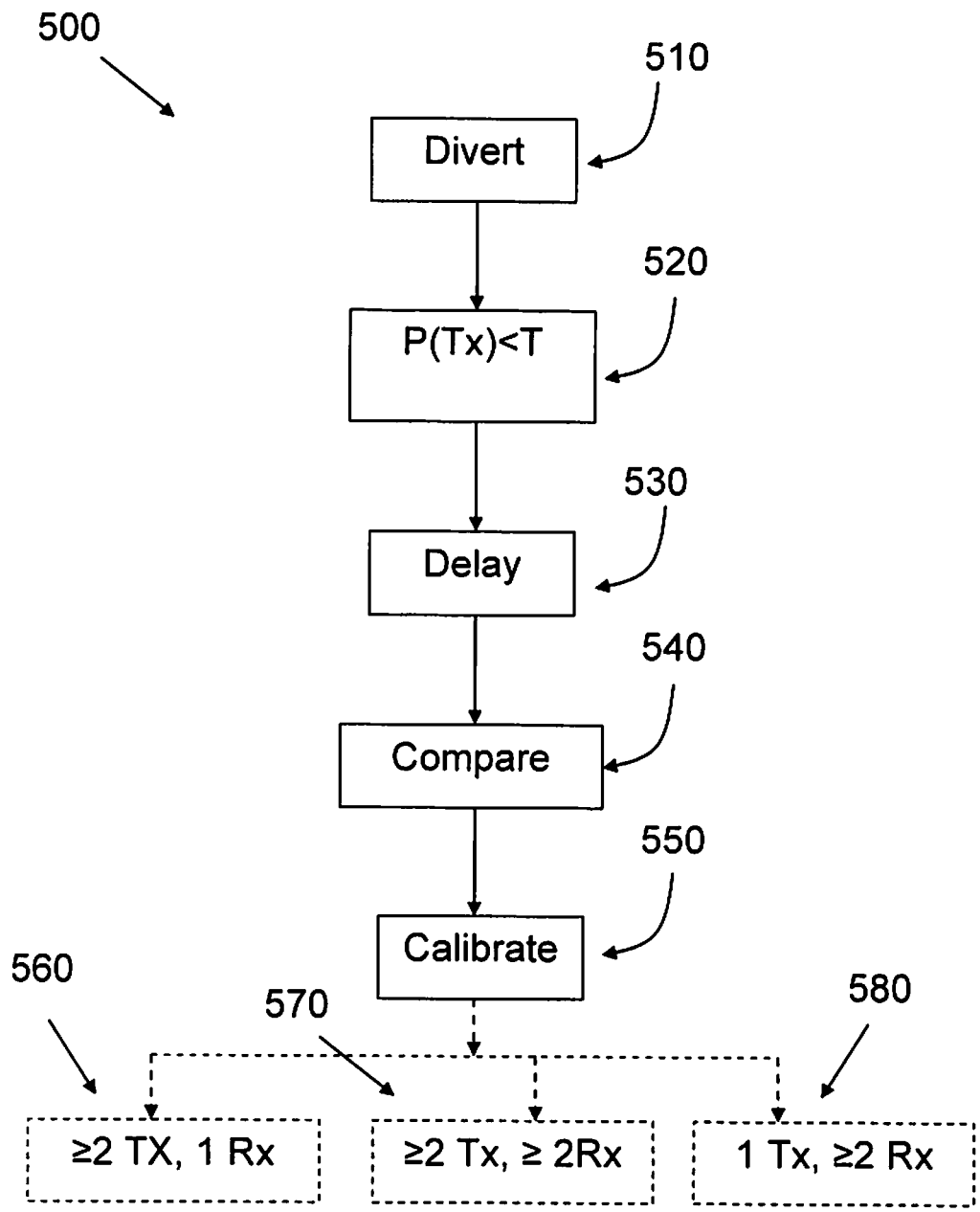
FIG. 5 shows a flowchart of a method of the invention.

FIG. 5 shows a schematic flow chart of a method 500 of the invention. Steps which are options or alternatives are shown with dashed lines in FIG. 5.

As has emerged from the description above, the method 500 is intended for use in an eNodeB in a cellular telecommunications system of the TDD kind, Time Division Duplex, in which eNodeB there is a transmitter part with at least a first and a second transmitter and a receiver part with at least a first receiver.

According to the method of the invention, at least part of a transmitted signal from each of the first and second transmitters is diverted, step 510, to the first receiver of the receiver part.

As indicated in step 520, the diversion is carried out when the output power of the transmitted signals falls below a first predefined threshold, and as indicated in step 530, the diverted signals are delayed so that the diverted signals are received by the receiver part at a predefined point in time. Step 540 shows that the diverted signals from the first and second transmitters are compared to each other after reception through the first receiver. As indicated in step 550, calibration of the transmitters is carried out based on said comparison.

Step 560 shows that in one embodiment of the method 500, at least part of a transmitted signal from any two or more transmitters in the transmitter part is diverted to the first receiver of the receiver part for comparison in the comparison unit and subsequent calibration, i.e. two or more transmitters are used, but only one receiver.

As indicated in step 570, the receiver part can be equipped with a plurality of receivers, and diverted transmitter signals are connected to one of these receivers, in a fixed or in an adaptive manner, and then fed from said receiver to the comparison unit. Thus, more than two receivers are chosen from here.

Step 580 shows that in one embodiment, a diverted transmitted signal from one of the transmitters is diverted to any two or more of a plurality of receivers, by means of which the two or more receivers may be calibrated using the comparison unit. Thus, here two or more receivers are used, but only one transmitter.

In one embodiment, the method 500 is applied in a TDD-system, Time Division Duplex, in which there are downlink, DL, periods and uplink, UL, periods, separated by guard periods, GP, in which said delay is such that a diverted transmitter signal is received by the receiver part during a guard period. In one version of this embodiment, the DL and UL periods are separated by fields in which the GPs are comprised, and the point in time when the diverted signals are received by the receiver part is during one of said fields.

The invention is not limited to the examples of embodiments described above and shown in the drawings, but may be freely varied within the scope of the appended claims.

The invention claimed is:

1. A transceiver of a network node in a Time Division Duplex (TDD) cellular telecommunications system in which there are downlink (DL) periods and uplink (UL) periods separated by guard periods (GPs), said transceiver comprising:
   a transmitter part adapted for Long Term Evolution (LTE) communications and comprising at least first and second transmitters;
   a receiver part with at least one receiver;
   a power meter;
   a diverting circuit configured to divert at least part of respective transmitted signals from each of the first and second transmitters of the network node to the at least one receiver of the receiver part of the network node, wherein the diverting circuit is connected to the transmitter part via a switch; and
   a delay component;
   wherein the power meter is adapted to activate said switch to a diversion position that diverts at least the part of the respective transmitted signals from the first and second transmitters of the network node to form diverted signals when the output power of the transmitted signals falls below a first predefined threshold,
   wherein the delay component is adapted to delay the diverted signals so that the diverted signals are received by the receiver part during one of the guard periods,
   wherein the transceiver further comprises a comparator for comparing the diverted signals from the first and second transmitters to each other after reception through the at least one receiver, and calibrating the transmitters based on said comparison.

2. The transceiver of claim 1, wherein:
   the transmitter part comprises a plurality of transmitters; and
   the transceiver further comprises a first additional switch that is configured to connect signals from any two or more of the plurality of transmitters to the diverting circuit.

3. The transceiver of claim 2, wherein:
   the receiver part comprises a plurality of receivers; and
   the first additional switch is also adapted to connect the diverted signals to one of the plurality of receivers, in a fixed or in an adaptive manner, so that the diverted signals are fed from said receiver part to the comparator.

4. The transceiver of claim 3, further comprising a second additional switch that is configured to divert the diverted signals to any of said plurality of receivers, so that the diverted signals from one of said transmitters are fed to two or more receivers, and calibrating the two or more receivers using the comparator.

5. The transceiver of claim 1, in which the DL and UL periods are separated by fields in which the GPs are comprised, and in which transceiver the power meter is adapted to activate the switch to a diversion position to occur during one of said fields.

6. The transceiver of claim 1, wherein the comparator is configured to compare the diverted signals from the first and second transmitters in a guard period separating a downlink period and an uplink period.

7. A method of a network node in a Time Division Duplex (TDD) cellular telecommunications system in which there are downlink (DL) periods and uplink (UL) periods separated by guard periods (GPs), the network node comprising a transmitter part with at least first and second transmitters and a receiver part with at least one receiver, and the method comprising:
   diverting at least part of a transmitted signal from each of the first and second transmitters of the network node to the at least one receiver of the receiver part of the network node in response to the output power of the transmitted signals from the first and second transmitters of the network node falling below a first predefined threshold, wherein the transmitter part of the network node is adapted for Long Term Evolution (LTE) communications;
   delaying the diverted signals so that the diverted signals are received by the receiver part during one of the guard periods;
   comparing the diverted signals from the first and second transmitters to each other after reception through the at least one receiver; and
   calibrating the transmitters in response to said comparison.

8. The method of claim 7, wherein diverting at least part of the transmitted signal comprises diverting at least part of the transmitted signal from each of the first and second transmitters in the transmitter part to the at least one receiver of the receiver part for use in the comparing and the calibration.

9. The method claim 7, in which the receiver part is equipped with a plurality of receivers, and further comprising passing the diverted transmitter signals through one of the plurality of receivers, in a fixed or in an adaptive manner, and then to the comparing.

10. The method of claim 7 further comprising:
    diverting a diverted transmitted signal from one of the transmitters to any two or more of said plurality of receivers; and
    calibrating the two or more receivers using a result of the comparing.

11. The method of claim 7, wherein in which the DL and UL periods are separated by fields in which the GPs are comprised, and wherein the diverting is controlled to occur during one of said fields.

12. The method of claim 7, wherein comparing the diverted signals from the first and second transmitters comprises comparing the diverted signals from the first and second transmitters in a guard period separating a downlink period and an uplink period.

\* \* \* \* \*